United States Patent
Kurtovic et al.

(10) Patent No.: US 10,422,363 B2
(45) Date of Patent: Sep. 24, 2019

(54) STRUCTURAL COMPONENT WITH A RIBLET SURFACE

(71) Applicant: Airbus Defence and Space GmbH, Ottobrunn (DE)

(72) Inventors: Ante Kurtovic, Paderborn (DE); Blanka Lenczowski, Neubiberg (DE); Juergen Steinwandel, Uhldingen-Muehlhofen (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 945 days.

(21) Appl. No.: 14/465,395

(22) Filed: Aug. 21, 2014

(65) Prior Publication Data
US 2015/0053289 A1 Feb. 26, 2015

(30) Foreign Application Priority Data
Aug. 22, 2013 (DE) .......................... 10 2013 013 817

(51) Int. Cl.
| | | |
|---|---|---|
| *B64C 23/00* | (2006.01) | |
| *B64C 21/10* | (2006.01) | |
| *F15D 1/00* | (2006.01) | |
| *B63B 1/36* | (2006.01) | |
| *B64C 1/00* | (2006.01) | |

(52) U.S. Cl.
CPC .............. *F15D 1/0035* (2013.01); *B63B 1/36* (2013.01); *B64C 1/0009* (2013.01); *B64C 21/10* (2013.01); *B64C 23/00* (2013.01); *F15D 1/004* (2013.01); *F15D 1/0045* (2013.01);
(Continued)

(58) Field of Classification Search
CPC ...... F15D 1/0035; F15D 1/0045; F15D 1/004; F15D 1/12; B64C 21/10; B64C 23/00; B64C 2230/08; B64C 2230/26; Y02T 50/166
See application file for complete search history.

(56) References Cited

U.S. PATENT DOCUMENTS

| | | | | |
|---|---|---|---|---|
| 1,531,967 A | * | 3/1925 | MacMillan | .............. B63H 1/20 |
| | | | | 416/236 R |
| 4,907,765 A | * | 3/1990 | Hirschel | ................. B64C 21/10 |
| | | | | 244/130 |

(Continued)

FOREIGN PATENT DOCUMENTS

| | | |
|---|---|---|
| DE | 10 2011 121 546 A1 | 6/2013 |
| EP | 1 283 163 A2 | 2/2003 |

(Continued)

OTHER PUBLICATIONS

German Office Action issued in German counterpart application No. 10 2013 013 817.5 dated Oct. 7, 2016 (Seven (7) sheets).

(Continued)

*Primary Examiner* — Richard R. Green
(74) *Attorney, Agent, or Firm* — Crowell & Moring LLP

(57) ABSTRACT

A structural component for a vehicle has a surface with a riblet structure. The riblet structure includes a plurality of grooves, including a first groove having a first longitudinal section forming a first angle with a main longitudinal direction of the structural component. The first angle is larger than 0° and the main longitudinal direction corresponds to a flow direction of a fluid along the surface of the structural component.

12 Claims, 2 Drawing Sheets

(52) U.S. Cl.
CPC ...... *B64C 2230/08* (2013.01); *B64C 2230/26* (2013.01); *Y02T 50/166* (2013.01); *Y10T 137/212* (2015.04)

(56) References Cited

U.S. PATENT DOCUMENTS

| | | | | |
|---|---|---|---|---|
| 5,114,099 | A * | 5/1992 | Gao | B64C 21/10 244/130 |
| 5,860,626 | A * | 1/1999 | Moser | B63B 1/36 244/130 |
| 6,345,791 | B1 * | 2/2002 | McClure | B63B 1/34 244/130 |
| 2011/0262705 | A1 * | 10/2011 | Gupta | B64C 21/10 428/156 |

FOREIGN PATENT DOCUMENTS

| | | | | |
|---|---|---|---|---|
| FR | 2 947 313 | A1 | | 12/2010 |
| FR | 3053074 | A1 * | 12/2017 | ............ F15D 1/004 |
| JP | 2002-266816 | A | | 9/2002 |
| WO | WO 2009/000703 | A1 | | 12/2008 |
| WO | WO 2012/082667 | A2 | | 6/2012 |
| WO | WO 2013/050018 | A1 | | 4/2013 |

OTHER PUBLICATIONS

German Office Action dated Mar. 28, 2014 (Six (6) pages).
European Search Report dated Feb. 18, 2015 with partial English translation (eight pages).

* cited by examiner

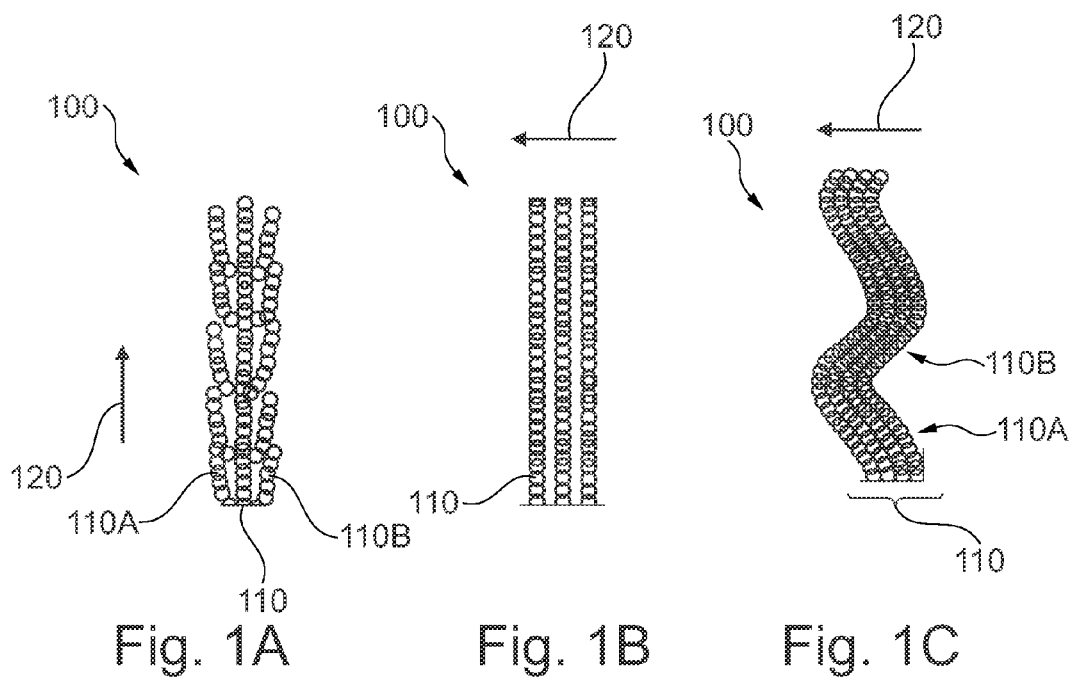
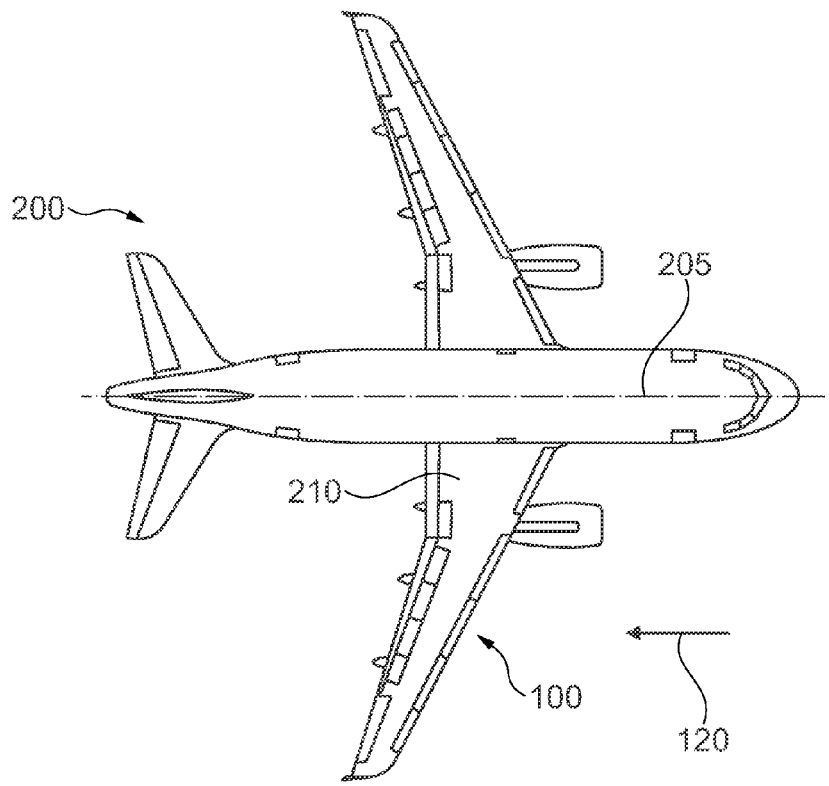

STRUCTURAL COMPONENT WITH A RIBLET SURFACE

FIELD OF THE INVENTION

Exemplary embodiments of the present invention relate to a structural component for a vehicle. The structural component has a surface with a riblet structure, which is able to reduce turbulent flows in a fluid stream along the surface.

BACKGROUND OF THE INVENTION

Riblets refer to a surface geometry or surface structure that brings about a reduction in the frictional resistance on surfaces across which turbulent flow occurs. These surface geometries can be fine ribs, for example, which have a pointy rib tip.

In fluid mechanics, a distinction is made between two different types of flows: laminar flow and turbulent flow. The majority of flows that occur in technical applications are turbulent. Turbulent flows generally have higher friction losses than laminar flows. The increased friction in the turbulent flow is created by momentum transfer transverse to the main flow direction in the boundary layer. The flow directly on the surface across which the flow occurs is dominated by vortical structures, which transport high-energy fluid to the wall surface. This additional momentum transfer as compared to the laminar flow is the reason for the increased wall friction in the turbulent boundary layer.

Riblet structures are typically used on surfaces of vehicles that are exposed to high loads by fluid streams, for example in the field of aviation or also for watercraft. A riblet structure comprises a plurality of ribs or peaks and valleys.

The ribs are disposed so that recessed channels or grooves extend between adjoining ribs. The channels typically extend in a direction along the flow direction of the fluid stream across the corresponding surface.

Riblets are able to reduce turbulent fluid flows, for example in the air or in the water, and support the creation of a laminar flow along the surface, whereby drag along the surface is also reduced.

The channels or grooves prevent transverse movements of the vortices in the turbulent flow. Surface friction can thus be reduced. Since the grooves have a low depth in the range of just a few μ meters, they do not represent increased roughness for the flow.

Care must be taken in the dimensioning of the grooves that these must be designed separately for each velocity range of the vehicle. While the riblets can typically be easily applied to the surface to be treated by way of films or adhesive films, the application of identical films to different vehicles is not readily possible due to the special adaptation of the riblet dimensions to the intended velocity range.

PCT International publication WO 2013/050018 A1 describes a riblet film and a method for producing a riblet film.

German patent publication DE 10 2011 121 546 A1 describes a method for generating a riblet structure on a surface of a structural component. The riblet structure is generated by scanning the surface with laser pulses.

SUMMARY OF THE INVENTION

Exemplary embodiments of the present invention are directed to a riblet structure that further reduces turbulent flows in a fluid stream along a surface and which can be produced with low complexity.

According to one aspect, a structural component for a vehicle is provided. The structural component has a surface having a riblet structure, wherein the riblet structure comprises a plurality of grooves. The structural component is characterized in that a first groove has a first longitudinal section forming a first angle with the main longitudinal direction of the structural component, wherein the first angle is larger than 0°, and wherein the main longitudinal direction of the structural component corresponds to a flow direction of a fluid along the surface of the structural component.

In other words, at least the first longitudinal section of a groove extends transversely to a flow direction of a fluid along the surface, forming a first angle larger than 0°.

The main longitudinal direction of the structural component corresponds to a main flow direction of a fluid along the surface of the structural component, without consideration of possible turbulent flow components. In other words, the main longitudinal direction or the main flow direction thus corresponds to a direction of movement of the vehicle when the structural component is attached to a vehicle.

The structural component can be a metallic structural component, or comprise a metal or a metal alloy. The riblet structure is directly incorporated into a surface of the structural component and is not perhaps applied by an adhesive film or the like.

In this way increased mechanical strength or stability of the riblet structure is achieved. Likewise, for example, complete or partial detachment of structured films can be prevented.

By directly incorporating the riblet structure into the surface of the structural component, rounding or blunting of the ribs can be prevented, for example, in particular when the structural component is made of metal and therefore has comparatively high mechanical strength.

Rounding or blunting of a riblet structure can cause the friction-reducing effect to be cancelled, so that turbulent surface flow forms instead of the laminar surface flow.

A groove of a riblet structure that is oriented transversely to the fluid flow direction at least sectionally can offer further protection against the formation of turbulent surface flows.

As is described above and hereafter, the structural component is particularly suited for use in aircraft and watercraft to reduce air drag or water drag along the surface of the corresponding craft. In aircraft, such a structural component is particularly suited for use on wings, and on these in particular on a surface facing the flow. In watercraft, such a structural component can be used in particular on areas that are exposed to the water current, which are thus located below the water when a watercraft is moving. Air drag is typically negligible in watercraft, however it may become a relevant parameter in high-speed watercraft, so that in this field the structural component can also be used above the waterline.

A riblet structure typically comprises ribs and interposed channels. The channels are recesses in the surface of the structural component, wherein these depressions are just a few μm deep, for example up to 10 μm.

These recesses can be generated by way of a pulsed laser beam or fine jet plasma, for example. The channels or ribs are formed by individual laser pulses and preferably adjoin each other and form a continuous structure. A femto laser is preferably used to form the riblet structure.

As is described above and hereafter, the riblet structure can also be incorporated into a painted structural component after a paint, or a paint layer, has been applied, so that the effectiveness of the riblet structure is not adversely impacted by subsequent painting.

According to one embodiment, the first groove has a second longitudinal section forming a second angle with the main longitudinal direction of the structural component, wherein the second angle is larger than 0° and different from the first angle.

In other words, the first groove has an irregular course in relation to the main longitudinal direction.

The first groove can have an undulating or a dentoid course in the direction of the main longitudinal direction or in a direction transversely to the main longitudinal direction.

According to a further embodiment, a depth of the first groove varies along a longitudinal direction of the first groove.

In particular, in the case of mechanical wear due to friction on the surface of the structural component, this can cause the effect based on the riblet structure to not completely disappear, since the riblet structure is not completely worn down due to the varying depths of the channels.

According to a further embodiment, the depth of the first groove decreases at least sectionally along the longitudinal direction of the first groove.

As a result, a channel disposed between two neighboring ribs is deeper at the front than at the back in the main longitudinal direction. The formation of a laminar flow can be favored by this design of the groove depth since, for example in the case of aircraft wings, the incident flow pressure is greater at the front in the main longitudinal direction, this being in the direction of flight, than at the back in the main longitudinal direction.

The grooves or channels thus become finer in a direction in the main longitudinal direction or in the main flow direction, which is to say from the front to the back, because they are less deep.

According to a further embodiment, a width of the first groove varies along a longitudinal direction of the first groove.

Like the depth, the width of a groove or of a channel between two ribs can be a parameter which, when varied in the longitudinal direction of the groove, can support the creation of laminar flow on the surface of the structural component.

According to a further embodiment, the width of the first groove decreases at least sectionally along the longitudinal direction of the first groove.

Together with a decreasing depth of the groove, the structure and geometry of the grooves thus becomes increasingly finer in the longitudinal direction.

In this context, however, it shall be pointed out that the depth and the width of a groove can basically be independent from each other and, in one embodiment, the depth of a groove can decrease as the width increases.

According to a further embodiment, the first groove has an undulating course at least sectionally.

The first groove can in particular extend in a sinusoidal manner. As an alternative, it can extend in a saw tooth-shaped manner.

This shape of the course is the shape of the first groove from a top view perspective onto the structural component. The first groove has a longitudinal direction which, despite the shape thereof, can be disposed transversely to the main flow direction, which is to say at an angle larger than 0° and smaller than or equal to 90°

According to a further embodiment, the first groove branches out in the main longitudinal direction of the structural component.

For this purpose, a respective side channel can branch off in the same or in opposing directions from a main channel of the first groove at constant or varying distances in the longitudinal direction of the first groove.

As an alternative, the first groove can include a channel of a first order, which branches out into two or more channels of a second order in the longitudinal direction, wherein these, in turn, branch out into two or more channels of a third order. This ensures increasing ramification and refinement of the riblet structure in the longitudinal direction of the first groove.

According to a further embodiment, the structural component has a second groove, which extends along the longitudinal direction of the first groove, wherein a distance between the first groove and the second groove varies along the main longitudinal direction of the structural component.

The second groove can essentially be composed according to the same principles as the first groove, however these do not have to be identical.

According to a further embodiment, a depth of the second groove deviates from a depth of the first groove.

The depths can deviate from each other in particular in neighboring sections of the first and second grooves, which is to say at the same height in the longitudinal direction of the grooves or in the main flow direction.

According to a further aspect, an aircraft comprising a structural component configured with riblets as described above.

The structural component can in particular be a wing or a fuselage section. The longitudinal direction of the riblets extends in a direction along the main flow direction of the air along the wings or the fuselage section, which is to say along a longitudinal axis or a direction of flight of the aircraft.

According to one embodiment, the structural component is designed as a wing, wherein the main longitudinal direction of the structural component extends parallel to a longitudinal axis of the aircraft.

Embodiments of the invention will be described hereafter with reference to the figures.

BRIEF DESCRIPTION OF THE FIGURES

FIG. 1A shows a schematic illustration of a riblet structure of a structural component according to one exemplary embodiment;

FIG. 1B shows a schematic illustration of a riblet structure of a structural component according to a further exemplary embodiment;

FIG. 1C shows a schematic illustration of a riblet structure of a structural component according to a further exemplary embodiment;

FIG. 2 shows an aircraft according to a further exemplary embodiment;

DETAILED DESCRIPTION OF EXEMPLARY EMBODIMENTS

Figures 3A, 3B:
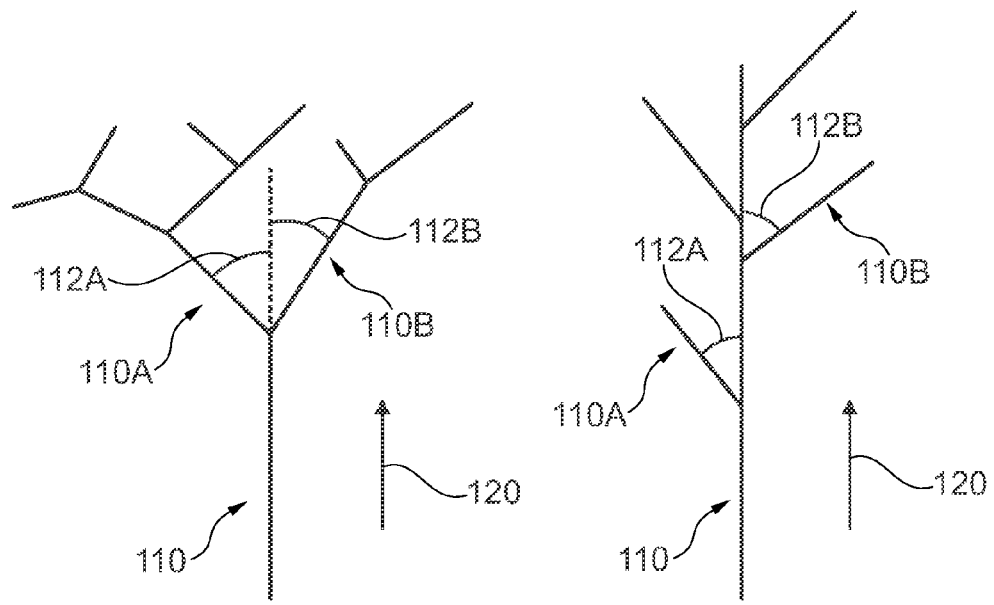
FIG. 3A shows a schematic illustration of a riblet structure of a structural component according to a further exemplary embodiment.
FIG. 3B shows a schematic illustration of a riblet structure of a structural component according to a further exemplary embodiment.

FIG. 1A shows a riblet structure on a surface of a structural component. Only a single groove is shown for the sake of better illustration, which has a main channel 110 and side channels 110A, 110B branching off therefrom in opposite directions. The main channel 110 extends in the direction of the flow direction 120 of a fluid, such as water or air, along a surface, while the side channels 110A, 110B extend transversely to the flow direction at least sectionally, and even change their course of direction.

The side channels 110A, 110B are thus the first and second longitudinal sections of the groove shown in FIG. 1A, which form different angles with the flow direction 120.

FIG. 1B shows a riblet structure in which three grooves 110 are shown. The three grooves extend parallel to each other and represent the channels, which is to say the recesses of the riblet structure. The undulated elevations are located between the shown grooves.

The riblet structure in FIG. 1B is disposed perpendicularly to the flow direction. The depths of grooves that are disposed consecutively in the flow direction 120 can deviate from each other, as was already described in detail above.

FIG. 1C shows a single wide groove 110 on a surface of a structural component. The groove 110 has an undulated course transversely to the flow direction 120. Due to the wave form, the first longitudinal section 110A and the second longitudinal section 110B from different or deviating angles with the flow direction 120.

In FIGS. 1A, 1B and 1C, the channels between the ribs are formed by mutually adjoining circles. The longitudinal direction of a channel corresponds to the direction in which the circles are disposed next to each other.

These circles symbolize how a laser pulse can be used or controlled according to a production method so as to produce the riblet structure on a workpiece surface. The laser is moved in the longitudinal direction of the channel before the next laser pulse creates a recess in the workpiece surface.

FIG. 2 shows an aircraft 200 having a longitudinal axis 205 extending in the direction of flight. The course of the longitudinal axis 205 is essentially parallel to a flow direction 120 of the air in relation to the aircraft when the aircraft is flying.

Two wings 210 extend away from the fuselage of the aircraft transversely to the longitudinal axis 205. The wings comprise a structural component as described above and hereafter. In particular a surface that is located at the front on the wings in the flow direction is treated so that the same has a riblet structure as described above and hereafter.

FIG. 3A shows a first groove 110 having an individual longitudinal section of a first order, which branches out into two longitudinal sections 110A, 110B of a second order, which in turn branch out into longitudinal sections of an order that, in each case, is higher by a value of one. The value of the order is incremented by one at each branching point.

The flow direction 120 can extend parallel to the longitudinal section of the first order.

The longitudinal section 110A forms a first angle 112A with the flow direction or with the longitudinal section of the first order, which is shown as a dotted line in an extension.

The longitudinal section 110B forms a second angle 112B with the flow direction or with the longitudinal section of the first order.

The longitudinal section of the first order can be wider, and also deeper, than the longitudinal sections of the second order, which, in turn, can be wider and deeper than the longitudinal sections of the third order, and so forth.

FIG. 3A thus shows a ramifying or branched structure of the first groove.

FIG. 3B shows a riblet structure having a continuous main channel 110, from which side channels in each case branch out alternately into a first direction and into an opposite second direction on the surface of the structural component, wherein the side channels 110A, 110B form angles with the main channel 110 which deviate from each other.

Figure 4:
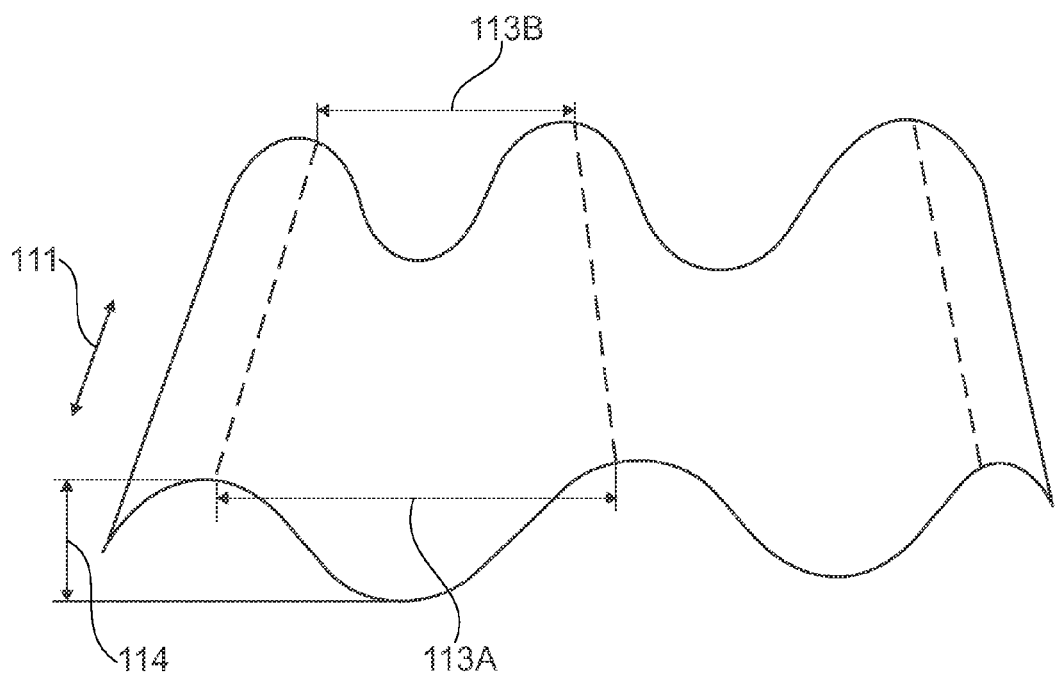
FIG. 4 shows a schematic illustration of a riblet structure of a structural component according to a further exemplary embodiment.

FIG. 4 shows a schematic isometric illustration of a riblet structure, wherein the neighboring grooves and ribs have a wave shape. For the sake of illustration, a linear longitudinal course of the grooves and ribs is shown, wherein the following comments essentially also apply to branched or ramified riblet structures.

The grooves and ribs extend in the longitudinal direction 111 and in each case have a depth 114 and a width 113A, 113B. The depth is indicated as the maximum distance between neighboring grooves and ribs, while the width is indicated as the distance between the highest points of neighboring ribs.

The depth of a groove can vary in the longitudinal direction 111 of a groove, and more particularly it can decrease in the direction of a flow direction of a fluid along the surface. The same applies to the width of a groove, since the width 113A measured at the front in the flow direction can be larger than the width 113B measured at the back in the flow direction.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A structural component for a vehicle, the structural component comprising:
   a surface; and
   a riblet structure comprising a plurality of grooves on the surface,
   wherein a first groove of the plurality of grooves has a straight longitudinal main section extending in a main longitudinal direction,
   wherein the first groove of the plurality of grooves also has a first longitudinal section forming a first angle with the main longitudinal direction of the structural component,
   wherein the first longitudinal section branches off the straight longitudinal main section at a branch and extends completely straight from said branch to an endpoint of the first groove, at which endpoint the first groove has no depth,
   wherein the first angle is larger than 0°, and
   wherein the main longitudinal direction extends in a flow direction of a fluid along the surface of the structural component.

2. The structural component of claim 1, wherein
   the first groove has a second longitudinal section forming a second angle with the main longitudinal direction of the structural component, the second angle is larger than 0° and different from the first angle.

3. The structural component of claim 1, wherein a depth of the first groove varies along a longitudinal direction of the first groove.

4. The structural component of claim 3, wherein the depth of the first groove decreases at least sectionally along the longitudinal direction of the first groove.

5. The structural component of claim 1, wherein a width of the first groove varies along a longitudinal direction of the first groove.

6. The structural component of claim 5, wherein the width of the first groove decreases at least sectionally along the longitudinal direction of the first groove.

7. The structural component of claim 1, wherein the first groove has an at least sectionally undulated course.

8. The structural component of claim 1, wherein the first groove branches out in the main longitudinal direction of the structural component.

9. The structural component of claim 1, further comprising:
   a second groove of the plurality of grooves, wherein the second groove extends along a longitudinal direction of the first groove,
   wherein a distance between the first groove and the second groove varies along the main longitudinal direction of the structural component.

10. The structural component of claim 9, wherein a depth of the second groove deviates from a depth of the first groove.

11. An aircraft comprising:
   a structural component, which comprises
   a surface; and
   a riblet structure comprising a plurality of grooves on the surface,
   wherein a first groove of the plurality of grooves has a straight longitudinal main section extending in a main longitudinal direction,
   wherein the first groove of the plurality of grooves also has a first longitudinal section forming a first angle with the main longitudinal direction of the structural component,
   wherein the first longitudinal section branches off the straight longitudinal main section at a branch and extends completely straight from said branch to an endpoint of the first groove, at which endpoint the first groove has no depth,
   wherein the first angle is larger than 0°, and
   wherein the main longitudinal direction extends in a flow direction of a fluid along the surface of the structural component.

12. The aircraft of claim 11, wherein
the structural component is a wing, and
the main longitudinal direction of the structural component extends parallel to a longitudinal axis of the aircraft.

* * * * *